July 10, 1923.
A. RAFFAY
BUSHING EXTRACTOR
Filed April 3, 1922
1,461,554
2 Sheets-Sheet 1
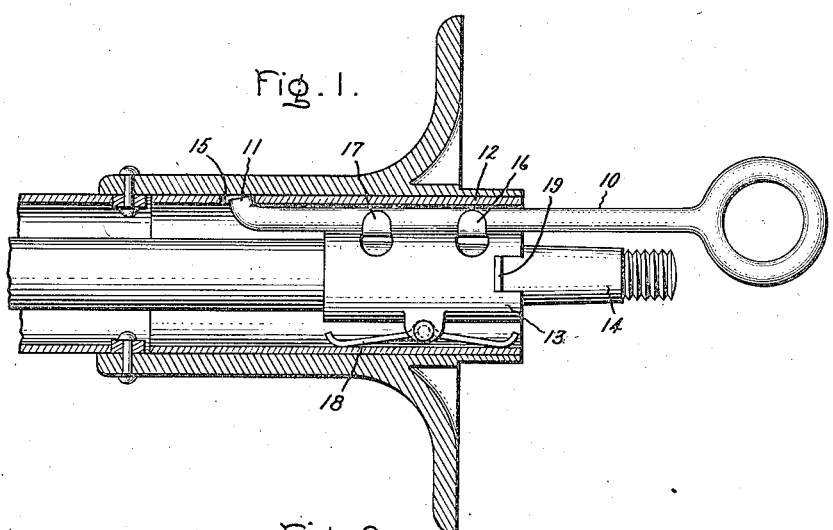
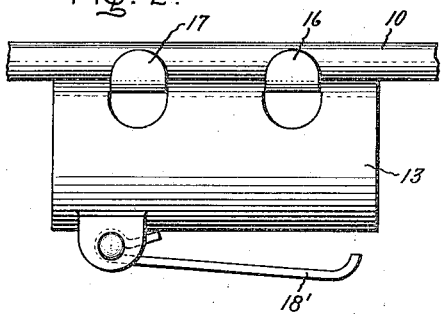
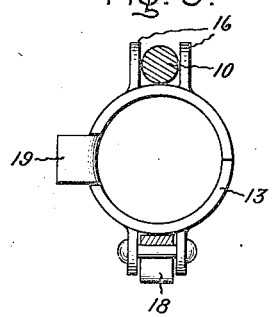
Inventor:
Andrew Raffay,
by Robert B. Meckley
His Attorney.

July 10, 1923.
A. RAFFAY
BUSHING EXTRACTOR
Filed April 3, 1922     2 Sheets-Sheet 2
1,461,554
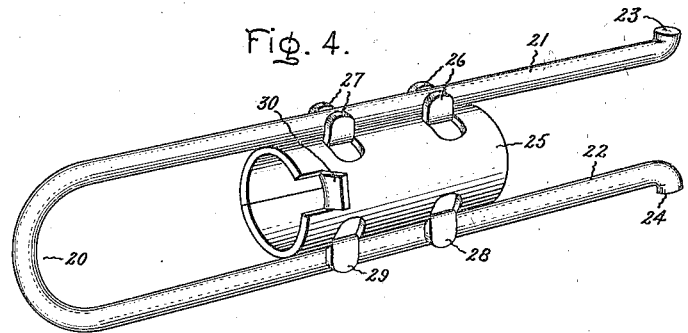
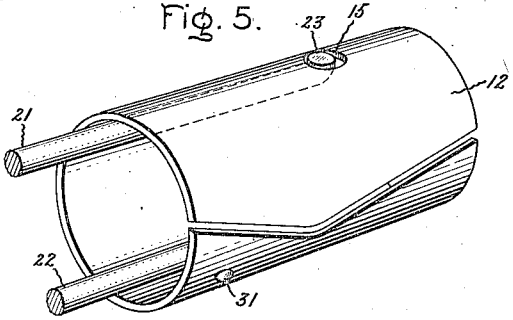
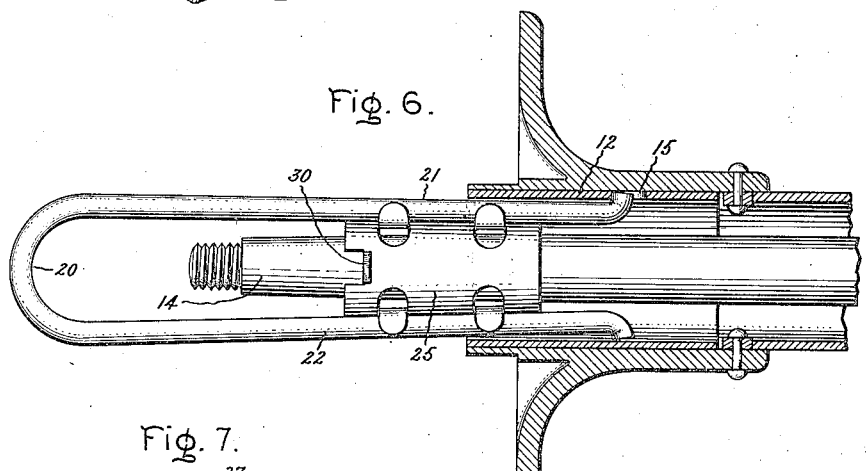
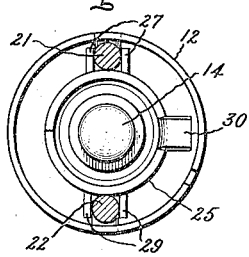
Inventor:
Andrew Raffay,
by Robert B. Meckley
His Attorney Patented July 10, 1923.

1,461,554

UNITED STATES PATENT OFFICE.

ANDREW RAFFAY, OF SCHENECTADY, NEW YORK.

BUSHING EXTRACTOR.

Application filed April 3, 1922. Serial No. 549,067.

*To all whom it may concern:*

Be it known that I, ANDREW RAFFAY, a citizen of the United States, residing at Schenectady, in the county of Schenectady, State of New York, have invented certain new and useful Improvements in Bushing Extractors, of which the following is a specification.

One of the objects of my invention is to provide a bushing extractor which shall be simple and rugged in construction, reliable in operation and cheap to manufacture.

Although not necessarily limited thereto, the invention is particularly applicable to the removal of bearing bushings from the rear shaft housings of automobiles having split roller bearing bushings, such for example as the Ford car. The removal of these bushings is difficult because of the fact that the bushings fit tightly in the rear shaft housing and the end of the bushing is flush with the end of the housing, so that the bushing can not be grasped for the purpose of removal without injuring the bushing, the housing, or the axle spindle. There is a hole in each rear shaft bushing of the Ford car for the purpose of supplying grease to the roller bearing. A pulling tool may be inserted within the bushing and hooked in this hole but it is difficult to hold the pulling tool in locking relation with the bushing so as to extract the bushing. The presence of the axle spindle interferes greatly with the operation of removal of the bushing.

In accordance with the invention, the pulling tool is readily located and securely held in locking relation with the bushing to be extracted, and the bushing is easily extracted without injuring the bushing, the housing or the axle spindle in any manner.

For a better understanding of the invention, reference is had to the accompanying drawings, in which Figure 1 is a sectional view of a rear axle housing with one form of a bushing extractor in accordance with the invention in position ready for the removal of the bushing; Fig. 2 is a detail of a modification of an arrangement for holding the pulling tool in position within the axle housing; Fig. 3 is a detail sectional view of the bushing extractor of Fig. 1; Fig. 4 is a perspective view of the preferred form of my bushing extractor; Fig. 5 is a detail showing a hook end of the pulling tool of Fig. 4 in locking position in the split bushing of a rear axle housing; Fig. 6 is a sectional view of a rear axle housing with the preferred form of my invention shown in Fig. 4 locked in position ready for the removal of the bushing; and Fig. 7 is a detail sectional view of the bushing extractor shown in Fig. 6.

Referring to the drawings, and in particular Figs. 1, 2 and 3, the bushing extractor comprises a pulling tool 10 which is provided with an integral upturned hook end 11 adapted to engage the bushing 12 for the purpose of removing the bushing. The pulling tool is held in locking relation with the bushing by means of the sleeve 13. This sleeve is arranged to be slid along the pulling tool over the axle spindle 14 so as to hold the hook end 11 in locking relation with the bushing, as for example, in the the hole 15 in the bushing. This sleeve is provided with two pairs of integral kicked-up ears 16 and 17 which form a guide for the pulling tool so as to hold these parts in their proper relative positions and to permit the bushing extractor to be inserted within the bushing as a unit with the sleeve 13 over the axle spindle 14, preparatory to the removal of the bushing. The sleeve and pulling tool are resiliently held in position, so that the pulling tool is in locking relation with the bushing, by means of the spring 18 secured to the sleeve diametrically opposite the guide way formed by the pairs of ears 16 and 17. The sleeve is also provided with an integral kicked-up projection or ear 19 for the purpose of sliding the sleeve back and forth within the axle bushing. In Fig. 2 I have shown a modified form of spring 18′ which may be used instead of the form of spring shown in Fig. 1.

As thus constructed and arranged the operation of my invention is as follows: The rear wheel of the car is first removed, the roller bearings are withdrawn and the bushing extractor is inserted within the bushing with the sleeve 13 disposed over the axle spindle 14. The sleeve 13 is slid over the axle spindle until the hook end 11 of the pulling tool makes a yielding engagement with the interior surface of the bushing 12. The pulling tool and sleeve are then moved about in the bushing until the hook end 11 of the pulling tool enters the hole 15 in the bushing, the resiliency of the support for the pulling tool assisting in forcing this hook end into the hole so that the operator can feel when the pulling tool is in proper position for the purpose of extracting the bushing. The sleeve 13 will then be slid inward over the axle spindle, thereby locking the hook end of the pulling tool with respect to the bushing. The bushing may then be readily removed by pulling on the ring end of the pulling tool.

The preferred form of my invention is shown in Figs. 4, 5, 6 and 7. In this form of the invention the pulling tool takes the form of a U-shaped fork 20 having two prongs 21 and 22. The free ends of these prongs converge and the prongs are held in their converged relation by the inherent resiliency of the U-shaped fork. The prong 21 is provided with an integral upturned end or hook 23 and the prong 22 is provided with a similar hook 24 on the free end thereof. The sleeve 25 is preferably, although not necessarily, frustro-conical in construction as shown in Fig. 6 so as to conform to the angle of inclination of the prongs of the fork. This sleeve is adapted to be slid over the axle spindle 14 and the fork and sleeve are adapted to be inserted within the axle bushing 12 as a unit. The two pairs of kicked-up ears 26 and 27 are aligned so as to provide a guide for the reception of the prong 21 of the fork and the two pairs of kicked-up ears 28 and 29 are aligned so as to form a guide for the reception of the prong 22 of the fork. The integral kicked-up projection 30 provides a means for sliding the sleeve 25 back and forth with respect to the prongs of the fork.

As thus constructed and arranged, the operation of my invention is as follows: It is assumed that the rear wheel of the car has been removed, that the roller bearings have been withdrawn as shown in Fig. 6, and that the sleeve 12 is to be withdrawn from the axle bushing. The U-shaped fork, with the sleeve 25 carried by the prongs of the fork, is inserted as a unit within the axle bushing with the sleeve 25 surrounding the axle spindle 14. The sleeve 25 is then moved toward the right as shown in Fig. 6 until the hook ends of the prongs 21 and 22 are resiliently held in engagement with the interior surface of the bushing. The bushing extractor may be then moved as a unit at will within the bushing and the hole 15 readily located. The arrangement is such that any one of the hook ends of the prongs may enter the hole in the bushing, the other hook end being resiliently held in engagement with the interior surface of the bushing. The sleeve 25 is then moved further toward the right, Fig. 6, thereby separating the prongs 21 and 22 further and locking the hook ends of the prongs securely with respect to the bushing. The sleeve is readily moved back and forth by means of the kicked-up projection or ear 30. Bushing 12 is held in position in the axle housing by the friction of the parts and also by the rounded protuberance 31. A sharp hammer blow on the end of the U-shaped fork in the direction to remove the bushing from the axle housing will cause the bushing to be moved outwardly and the protuberance 31 to disengage from the depression in the axle housing which receives this protuberance. The arrangement is such that the split bushing is permitted to contract while it is being extracted. The bushing is then completely and easily withdrawn from the axle housing by a pull applied to the loop end of the pulling tool. When the bushing has been withdrawn, the sleeve 25 may be slid along the prongs of the fork away from the free ends of the fork so that the free or hook ends of the fork may converge in accordance with their natural resiliency. The fork and sleeve may thereupon be removed as a unit from the bushing and the bushing extractor is in condition ready to be used in the extraction of another bushing.

The sleeve 25 may be made of a single stamping of metal, the ears 26 to 28 inclusive and the projection 30 punched or kicked-up in one operation and the sleeve then bent into the frustro-conical shape shown. The sleeve therefore lends itself very readily to large scale manufacture. The U-shaped fork is very simple in construction and when made in quantities it may be formed from a round section steel rod in one operation by a suitably designed machine.

It will be obvious to those skilled in the art that the device is very simple in construction, cheap to manufacture and rugged so as to withstand the severe service to which devices of this nature are subjected. The device is so simple that there is practically nothing to get out of order and there is practically nothing about the device to become worn or used in service so that the device may be used repeatedly and for a long length of time by even an unskilled mechanic. Furthermore it is to be noted that the bushing of the rear axle housing is withdrawn without any injury to the bushing so that the bushing may be reinserted in the axle housing after having been withdrawn in case it is not necessary to replace the same.

In accordance with the provisions of the patent statutes I have described the principle of operation of my invention together with the apparatus which I now consider to represent the best embodiment thereof but I desire to have it understood that the apparatus shown is only illustrative and that the operation may be carried out by other means.

What I claim as new and desire to secure by Letters Patent of the United States, is:—

1. A bushing extractor comprising a pulling tool having a hook end adapted to engage the bushing, and a sleeve movable along the said tool toward the hook end thereof and adapted to be slid over the axle spindle for holding the hook end of the pulling tool in locking engagement with the bushing.

2. A bushing extractor comprising a hook having an integral upturned end adapted to engage the bushing, and a sleeve adapted to be inserted within the bushing over the axle spindle for forcing the said end of the hook radially outward with respect to the said spindle into locking engagement with the bushing when moved relatively to the bushing.

3. A bushing extractor comprising a pulling tool having a hook end adapted to engage the bushing, and a sleeve adapted to be inserted within the bushing over the axle spindle and to be moved along the said tool toward the said hook end for holding the hook end of the said tool in locking engagement with the bushing, the said sleeve having guiding means on the periphery thereof for the reception of the said tool.

4. A bushing extractor comprising a fork having a hook end on one of the prongs thereof adapted to engage the bushing, and a sleeve carried by the prongs of the said fork, the said sleeve adapted to be inserted within the bushing over the axle spindle for forcing the said hook end radially outward with respect to the axle spindle into locking engagement with the bushing when moved axially of the bushing.

5. A bushing extractor comprising a fork having prongs, the free ends of which are resiliently held in converged relation, and means for separating the said prongs and holding the same in locking engagement with the bushing.

6. A bushing extractor comprising a fork having prongs, the free ends of which are resiliently held in converged relation, hooks on the ends of the said prongs, and a sleeve carried by the said prongs for separating the prongs and holding the said hooks in locking relation with the bushing.

7. A bushing extractor comprising a U-shaped fork having prongs which converge towards their free ends and which are resiliently held in their converged relation, hooks on the free ends of the said prongs, and a sleeve carried by and movable along the said prongs for separating the prongs and holding the fork in locking relation with the bushing.

8. A bushing extractor comprising a fork having prongs which converge towards their ends, the free ends of the said prongs adapted to engage the bushing, and a frustro-conical sleeve carried by and movable along the said prongs axially of the bushing for securing the said fork in locking engagement with the bushing.

9. A bushing extractor comprising a fork having prongs with hooks on the free ends thereof, any one of the said hooks adapted to engage a hole in the bushing, and a sleeve carried by the prongs of the said fork, the said sleeve and fork adapted to be inserted within the bushing with the sleeve surrounding the axle spindle, and the said sleeve movable axially of the bushing to lock the hook end of one of said prongs in the hole in the bushing and the remainder of the hooks in engagement with the interior surface of the bushing.

10. A bushing extractor comprising a fork having two prongs which converge towards their free ends, hooks on the free ends of the said prongs, either one of said hooks adapted to engage a hole in the bushing, and a frustro-conical sleeve carried by the prongs of the said fork and movable along the prongs thereof, the said sleeve and fork adapted to be inserted as a unit within the bushing with the sleeve surrounding the axle spindle and the sleeve movable axially of the bushing to lock the hook end of one of the prongs in the hole in the bushing and hold the hook end of the other prong in engagement with the interior surface of the bushing.

11. A bushing extractor comprising a U-shaped fork having prongs which converge towards their free ends and are resiliently held in their converged relation, hooks on the free ends of the said prongs, either one of said hooks adapted to engage a hole in the bushing and a frustro-conical sleeve carried by the prongs of the said fork, the said sleeve and fork adapted to be inserted within the bushing with the sleeve surrounding the axle spindle and the sleeve movable axially of the bushing to lock the hook end of one of the said prongs in the hole in the bushing and hold the hook end of the other prong in engagement with the interior surface of the bushing, the said sleeve having integral kicked-up projections which form guides for the prongs of the said fork and an integral kicked-up projection for moving the sleeve with respect to the fork.

12. As an element of a bushing extractor, a sleeve having two pairs of aligned kicked-up integral projections forming two guides for a pulling tool, and a kicked-up integral projection for moving the sleeve back and forth with respect to the pulling tool.

In witness whereof I have hereunto set my hand this 31st day of March, 1922.

ANDREW RAFFAY.